United States Patent [19]

Edwards et al.

[11] Patent Number: 4,824,564

[45] Date of Patent: Apr. 25, 1989

[54] DRY SUMP LIQUID FILTER

[75] Inventors: Evan A. Edwards, Pittsford; James T. Greene; Richard Mayo, both of Baldwinsville, all of N.Y.

[73] Assignee: Eastman Kodak Company, Rochester, N.Y.

[21] Appl. No.: 238,963

[22] Filed: Aug. 25, 1988

Related U.S. Application Data

[63] Continuation of Ser. No. 926,612, Nov. 4, 1986, abandoned.

[51] Int. Cl.$^4$ .................. B01D 27/04; B01D 27/08; B01D 35/30
[52] U.S. Cl. .................................. 210/232; 210/248; 210/436; 210/438; 210/440; 210/443; 210/493.4; 210/494.1
[58] Field of Search .............. 210/232, 248, 436, 438, 210/440, 443, 493.4, 494.1, 437

[56] References Cited

U.S. PATENT DOCUMENTS

| | | | |
|---|---|---|---|
| 1,896,310 | 2/1933 | Hildebrand | 210/169 |
| 2,071,527 | 2/1937 | Howard | 210/132 |
| 3,344,925 | 10/1967 | Graham | 210/437 |
| 3,726,407 | 4/1973 | Weyard | 210/435 |
| 4,452,697 | 6/1984 | Conrad | 210/172 |

FOREIGN PATENT DOCUMENTS

| | | | |
|---|---|---|---|
| 1143279 | 2/1961 | Fed. Rep. of Germany | 210/232 |
| 217593 | 5/1968 | U.S.S.R. | 210/232 |

Primary Examiner—Richard V. Fisher
Assistant Examiner—Wanda L. Millard
Attorney, Agent, or Firm—Herman J. Strnisha

[57] ABSTRACT

A liquid filter apparatus, for connection to inlet and outlet piping, includes a housing which is integral with the piping and a removable integral filter unit in the housing. The integral filter unit includes bottom and top end caps with a core tube and a concentric outer tube extending between the end caps. A filter element between the core tube and the outer tube stands on ribs extending upward from the bottom end cap and is spaced from the top end cap by similar ribs extending downward from the top end cap, these ribs creating radial flow channels above and below the filter element. The filter element is a wound spiral of filter material and separator forming a plurality of axial flow channels. Some of these axial flow channels are open at the top to receive liquid from the top radial flow channel and closed at the bottom, and some of the axial channels are closed at the top and open at the bottom to discharge liquid into the bottom radial flow channel. Filter action is by way of radial flow, through the filter material, from the open-top channels to the open-bottom channels. The housing cover is removable to remove and replace the filter. Means are provided to vent air from the system and to drain liquid from the system for removal and replacement of the filter without having to clean the housing.

2 Claims, 3 Drawing Sheets

DRY SUMP LIQUID FILTER

This is a continuation of application Ser. No. 926,612, filed Nov. 4, 1986, now abandoned.

BACKGROUND OF THE INVENTION

1. Field of the Invention

This invention relates to a liquid filter and housing allowing replacement of the filter element without spillage because the dry housing is not part of the filter fluid path.

2. Description of the Prior Art

Most liquid filters are installed by the user in a steel housing which is a part of the filter and of the liquid path through it. Such a prior art housing typically has inlet and outlet pipe connections and is a pressure vessel with a heavy cover clamped in place. For filtering viscous liquids, the clean-up of the conventional stainless steel housing is arduous; and the use of a stand-alone throw-away filter directly connected to inlet and outlet lines may not be allowable if certain hazardous solvents are involved.

In the prior art, U.S. Pat. No. 1,896,310 to Hildebrand discloses a stand-up water filter having a cylindrical filter element which operates in a filter mode when one faucet is open and in a flush mode when another faucet is open. An outer shell 1, which is apparently only an aesthetic cover, surrounds an inner shell 4, which is the operative fluid flow housing.

SUMMARY OF THE INVENTION

It is an object of this invention to provide a dry sump housing and filter unit in which the housing has permanently piped inlet and outlet connections, and the inside of the housing remains dry and requires little if any clean-up and permits replacement of the filter element without spillage of liquid.

The invention may be summarized as a liquid filter apparatus, for connection to inlet and outlet piping, and including a housing which is connected to the piping and a removable filter in the housing. The filter includes bottom and top end caps, with a core tube and a concentric outer tube extending between the end caps. A filter element between the core tube and the outer tube stands on ribs extending upward from the bottom end cap and is spaced from the top end cap by similar ribs extending downward from the top end cap, these ribs creating radial flow channels above and below the filter element. The filter element is a wound spiral of a sandwich including a flat filter sheet material and a corrugated polymeric separator sheet forming a plurality of axial flow channels. Some of these axial flow channels are open at the top to receive liquid from the top radial flow channel and closed at the bottom, and some of the axial channels are closed at the top and open at the bottom to discharge liquid into the bottom radial flow channel. Filter action is by way of radial flow, through the filter material, from the open-top channels to the open-bottom channels. The housing cover is removable to remove and replace the filter. Means are provided to vent air from the system and to drain liquid from the system for removal and replacement of the filter.

DESCRIPTION OF THE PREFERRED EMBODIMENT

Figure 1:
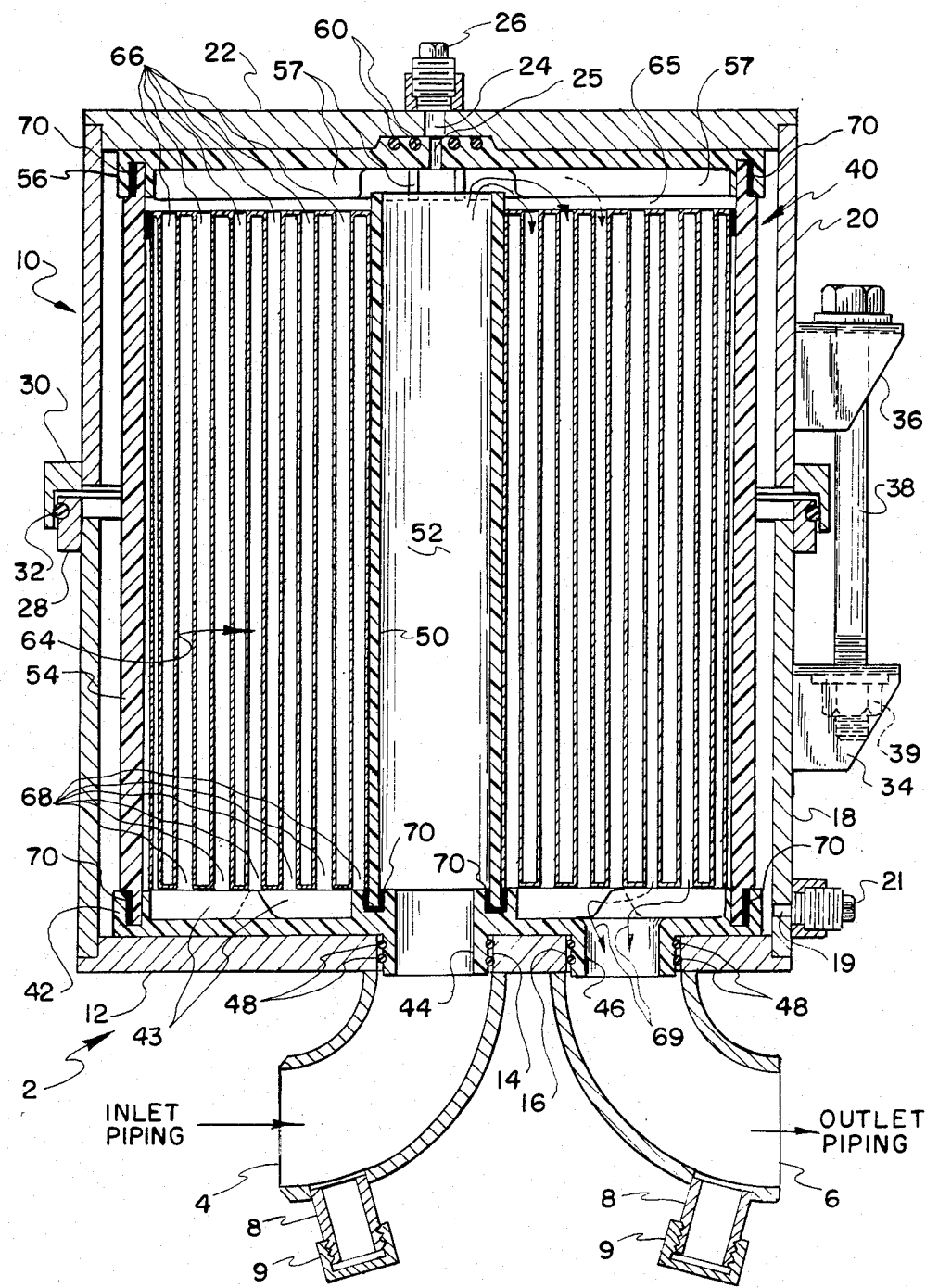
FIG. 1 is a sectional elevation view of the filter and housing of this invention.

Referring now to the drawing, the housing and filter combination of this invention, generally indicated at 2, includes a housing 10 supporting and enclosing a filter 40. Housing 10 is a permanent fixture, connected to inlet piping 4 and outlet piping 6, each of these having a capped drain fitting 8. Housing 10 includes a base plate 12, which is welded to the inlet and outlet piping and is apertured at 14, 16 in registry with that piping. The side wall of housing 10 includes a lower housing section 18 and an upper housing section 20. A cover plate 22, having a central vent aperture 24 and a vent fitting 26, is welded to the top of the upper section 20. Thus, the base plate 12, the upstanding lower and upper side wall sections 18 and 20, and cover plate 22 form the cylindrical housing 10 in which the filter 40 is positioned. A leak check aperture 19 and associated fitting 21 are provided near the base of the lower housing section 18.

The upper housing section 20 and cover plate 22 are removably connected to the lower housing section 18 by means of a clamping arrangement. Several forms of such a clamping arrangement are possible, none of them being critical to the invention. In the presently preferred embodiment, a lower housing ring 28 surrounds the circumference of the lower housing section 18, and an upper overlapping housing ring 30 surrounds the circumference of the upper housing section 20. Housing rings 28 and 30 are welded to their respective sections 18 and 20. The upper housing section 20 engages the lower housing section 18 by means of these mating rings 30 and 28 which form a sealed engagement when connected by means of an O-ring 32. A plurality of lower flange brackets 34 and corresponding upper flange brackets 36 are welded respectively to the lower and upper housing sections 18 and 20 at points around their outer circumference. A clamping screw 38 and nut 39 releasably clamp the upper housing to the lower housing at these several bracket locations; and when tightened, the housing 10 is secure.

The filter 40 is an integral unit which fits into the housing 10 and is removable from it. Filter 40 includes a bottom end cap 42 having apertured nipples 44 and 46 extending into respectively the inlet and outlet apertures 14 and 16 in the base plate of the housing. The nipples 44 and 46 of the bottom end cap 42 fit snugly and sealingly within the apertures 14 and 16 in the base plate by means of suitable O-ring seals 48. An inner cylindrical core tube 50 of a plastic material, for example polypropylene, is sealed to the bottom end cap around its inlet aperture 44 with a sealant such as an electro-magnetically activated polypropylene adhesive sealer or similar suitable sealing composition. Core tube 50 stands upright from the bottom end cap forming an inlet channel 52 which leads directly from the inlet piping 4. An outer cylindrical tube 54, concentric with core tube 50 and also of a similar plastic material, is also sealed to the bottom end cap 42 near its periphery and stands upright from the bottom end cap. A top end cap 56 of a plastic material such as polypropylene is mounted and sealed atop the outer tube 54. The top end cap 56 of the filter abuts directly against the cover plate 22 of the housing, giving longitudinal support to the filter. A pair of sealing O-rings 60 surround the vent apertures 24 and 25 in the cover plate 22 and end cap 56 respectively at the interface between cover plate 22 and end cap 56. The sealing engagements of the bottom end cap 42 with the core tube 50 and the outer tube 54, and the sealing engagement of the top end cap 56 with the outer tube 54, are all represented by deposits 70 of sealant at the respective locations of connection.

Figure 2:
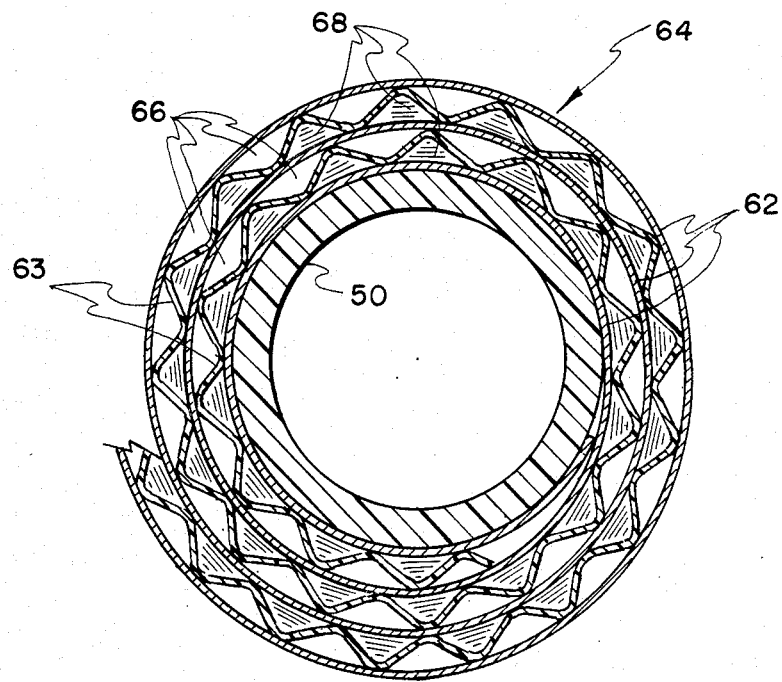
FIG. 2 is a schematic top view, somewhat enlarged, of a filter element according to this invention.
Figure 3:
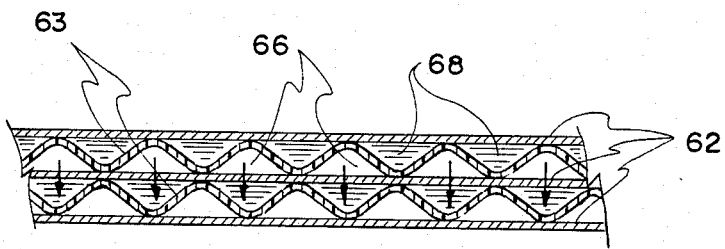
FIG. 3 is a still further enlarged schematic detail of FIG. 2.

A filter element 64 (see also FIG. 2) is a spiral wound roll of a sandwich including a flat filter sheet material 62 interleaved with a corrugated polymeric separator sheet 63. The corrugations provide spacing between successive layers of the filter sheet 62, which spaces are axial flow channels for the liquid passing through the filter. Alternate axial channels 66 are blanked off at the bottom, while successive alternate axial channels 68 are blanked off at the top, as suggested by the shade lines in channels 68, so that fluid enters at the top of the open-top channels 66 and leaves at the bottom of the open-bottom channels 68. Filter action is by way of radial flow, through the filter material 62, from the open-top channels 66 to the open-bottom channels 68 as indicated in FIG. 3. The blanking of the ends of the flow channels is formed by a hot melt plastic.

Figure 4:
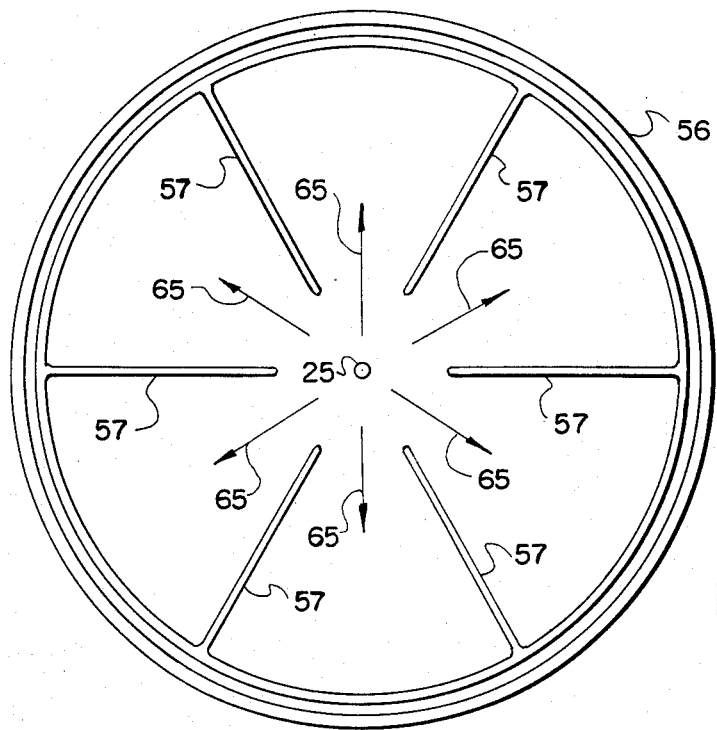
FIG. 4 is a bottom view of the top end cap.
Figure 5:
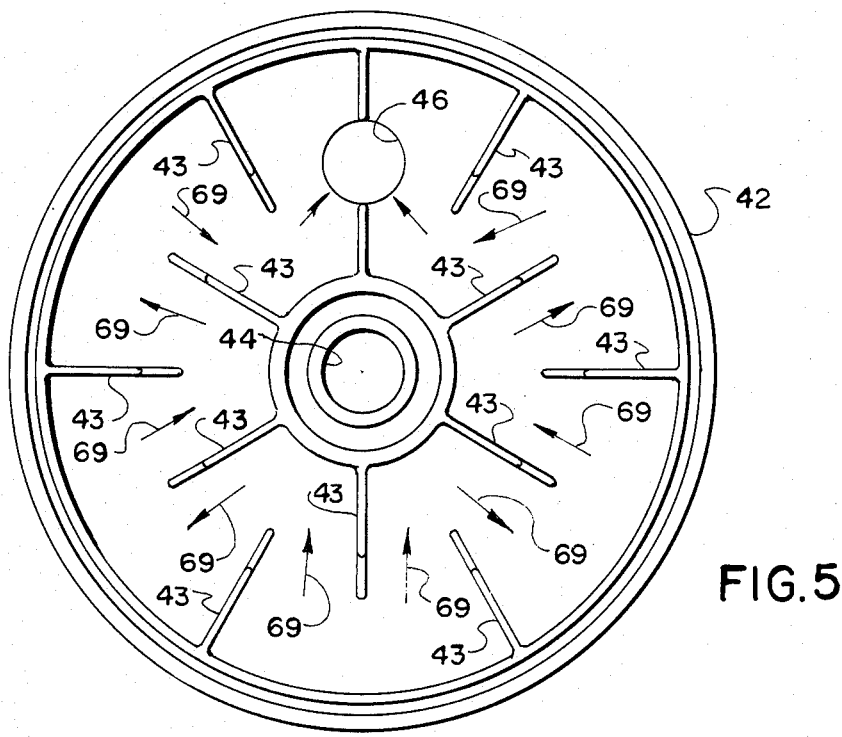
FIG. 5 is a top view of the bottom end cap.

Referring now to FIGS. 4 and 5, radial flow channels 65 are formed in the top end cap 56 (FIG. 4) by means of radial ribs 57 depending from the top end cap. Similarly, radial flow channels 69 are formed in the bottom end cap 42 (FIG. 5) by means of radial ribs 43 extending upward from the bottom end cap. Radial ribs 43 on the bottom end cap alternately extend partially inward from the outer radius, while successive alternate ribs extend partially outward from the inner radius to provide a circumferential flow path to the off-center outlet aperture 46 as well as radial flow paths from the open-bottom channels 68 through the range of their radial locations.

When a filter is to be changed, the fluid system will be shut down and drain caps 9 removed to drain off the liquid remaining in the filter. Then the cover plate 22 and upper housing section 20 are removed by loosening and removing the clamping screws 38. The filter 40 is then easily grasped and lifted out. If it is immediately turned upside down, the solid top end cap 56 will prevent any further dripping or draining of the dirty filter.

Little, if any, clean-up of the stainless steel housing will be required because the interior of the housing is not wetted by the liquid when the unit is in operation. If draining through the drain nipples 8 is completed before disassembly, the only wetting of the housing interior should be by incidental dripping when the filter unit is removed. It may be desirable, in order to promote the best possible drainage, to have the inlet and outlet piping installed such that there is a slight tilt of the entire unit toward the outlet pipe 6. This will aid the gravity flow of liquid residue to the outlet pipe 6 when the system is shut down.

A clean filter 40 is then inserted into the housing 10, and the cover plate 22 and upper housing section 20 replaced. As clamping screws 38 are tightened, the cover plate 22 is drawn down against the top end cap 56 and against O-rings 60. Thus, all seals, top and bottom, between filter 40 and housing 10 are made effective.

Some applications of the filter of this invention may not require venting, and therefore the venting arrangement shown at 26 may not be essential. Also, it is possible, but not presently preferred, that the inlet and outlet pipings can be reversed, i.e., piping 6 might be the inlet piping and piping 4 the outlet. Finally, while the unit is shown as simply mounted on permanent and stable piping, it may instead be fixed to a wall or other support structure for connection with more flexible piping.

We claim:
1. A liquid filter apparatus for connection to inlet and outlet piping, including a housing connected to said piping and an integral filter unit removably inserted into said housing, such housing permitting replacement of said integral filter unit without spillage of liquid;
    said housing including:
    a. a base plate having fixed inlet and outlet apertures communicating, respectively, with said inlet and outlet piping;
    b. a side wall extending from the peripheral region of said base plate;
    c. a cover plate mounted atop said side wall, said cover plate having a vent aperture therein and removably mounted relative to said base plate;
    said integral filter unit including:
    d. a bottom end cap having inlet and outlet apertures and adapted for sealing engagement with the respective inlet and outlet apertures of said base plate;
    e. a cylindrical core tube surrounding the inlet aperture of said bottom end cap and in sealing engagement with said bottom end cap and extending upwardly therefrom, said core tube effecting a continuation of said inlet piping;
    f. a concentric cylindrical outer tube extending upwardly from the periphery of said bottom end cap and in sealing engagement with, respectively, said inlet and outlet apertures in said plate;
    g. a top end cap mounted atop said outer tube, and in sealing engagement with said outer tube, said top end cap having a vent aperture in registry with the vent aperture in said cover plate;
    h. a filter element disposed between said core tube and said outer tube;
    i. said bottom and top end caps each including axially extending ribs to create, respectively, bottom and top radial flow channels below and above said filter element; and
    j. said filter element including a porous filter material defining a plurality of axial flow channels: some of said axial flow channels being open at their tops and open at their bottoms to discharge liquid into said bottom radial flow channel, whereby filter action is by way of radial flow from those axial flow channels with open tops to those axial flow channels with open bottoms; whereby said integral filter unit defines the complete liquid flow path through said apparatus from said inlet to said outlet apertures.

2. An integral liquid filter unit for removable insertion into a housing for positioning said filter unit in operative engagement with inlet and outlet piping to said housing;
    said filter unit including a bottom end cap apertured to correspond with said housing, an inner cylindrical cover tube and an outer concentric cylindrical tube extending upward from said bottom end cap, a top end cap mounted atop said outer tube, said inner and outer tubes being in sealing engagement with said bottom end cap and said outer tube being in sealing engagement with said top end cap, and a cylindrical filter element surrounding said inner core tube and within said outer tube and axially spaced from said top and bottom end caps, each including axially extending ribs to create, respectively, top and bottom radial flow channels below and above said filter element; and said filter element being formed of a porous filter material defining a plurality of axial flow channels, some of said axial flow channels being open at their tops and closed at their bottoms, some of said axial flow channels being closed at their tops and open at their bottoms, whereby filter action is by way of radial flow from those axial flow channels with open tops to those axial flow channels with open bottoms.

* * * * *

UNITED STATES PATENT AND TRADEMARK OFFICE
CERTIFICATE OF CORRECTION

PATENT NO. : 4,824,564

DATED : April 25, 1989

INVENTOR(S) : E. A. Edwards, J. T. Greene, R. Mayo

It is certified that error appears in the above-identified patent and that said Letters Patent is hereby corrected as shown below:

In column 4, lines 34 and 35 cancel "and in sealing engagement with, respectively, said inlet and outlet apertures in said plate"

In column 4, at the end of line 48, insert --and closed at their bottoms to receive liquid from said top radial flow channels, some of said axial flow channels being closed at their tops--

In column 4, in line 63, cancel "cover" and insert --core--

Signed and Sealed this

Fifteenth Day of May, 1990

Attest:

HARRY F. MANBECK, JR.

*Attesting Officer*      *Commissioner of Patents and Trademarks*